US012648523B2

(12) United States Patent

Sanders

(10) Patent No.: US 12,648,523 B2

(45) Date of Patent: Jun. 9, 2026

(54) CONSISTENT FLOW WINDGUARD FOR AGRICULTURAL BALER

(71) Applicant: CNH Industrial America LLC, New Holland, PA (US)

(72) Inventor: Ryan Sanders, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 391 days.

(21) Appl. No.: 18/212,821

(22) Filed: Jun. 22, 2023

(65) Prior Publication Data

US 2024/0423138 A1     Dec. 26, 2024

(51) Int. Cl.
*A01F 17/02*        (2006.01)
*A01D 89/00*        (2006.01)

(52) U.S. Cl.
CPC ............ *A01F 17/02* (2013.01); *A01D 89/001* (2013.01)

(58) Field of Classification Search
CPC .............................. A01F 17/02; A01D 89/001
See application file for complete search history.

(56) References Cited

U.S. PATENT DOCUMENTS

| | | | |
|---|---|---|---|
| 5,315,925 A | 5/1994 | Viaud et al. | |
| 6,877,304 B1 * | 4/2005 | Smith | ................... A01F 15/106 56/364 |
| 11,547,053 B2 | 1/2023 | Lammerant et al. | |
| 2009/0100814 A1 * | 4/2009 | Egging | ................ A01D 89/008 56/1 |
| 2011/0088365 A1 * | 4/2011 | Smith | .................... A01D 80/02 56/364 |
| 2021/0045292 A1 | 2/2021 | Babler et al. | |
| 2024/0032476 A1 * | 2/2024 | Giuliani | ............... A01D 89/002 |

FOREIGN PATENT DOCUMENTS

WO      WO-2024100478 A1 *   5/2024   ........... A01D 89/008

* cited by examiner

*Primary Examiner* — Joseph M Rocca
*Assistant Examiner* — Jose Antonio Martinez
(74) *Attorney, Agent, or Firm* — Buchanan Ingersoll & Rooney PC

(57)        ABSTRACT

An agricultural baler includes a chassis, a bale chamber supported by the chassis, and a pickup with a windguard assembly. The windguard assembly includes a rotating front roller with spaced-apart channels disposed circumferentially on the exterior surface of the front roller and a tine bar configured to be arranged above the front roller. The tine bar has spaced-apart tines that extend downwardly from the tine bar, wrap around the front roller, and extend rearwardly from the front roller toward the bale chamber.

20 Claims, 5 Drawing Sheets

CONSISTENT FLOW WINDGUARD FOR AGRICULTURAL BALER

FIELD OF THE INVENTION

The present invention relates to agricultural balers, and, more particularly, to windguard systems used with such balers.

BACKGROUND OF THE INVENTION

Agricultural packaging machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine defining the straw (such as wheat or oat straw, for example) which is to be picked up by the baler. The cut crop material is typically raked and dried, and a baler, such as a round baler or a square baler, for example, straddles the windrows and travels along the windrows to pick up the crop material and form it into round or square bales. More specifically, a pickup unit at the front of the baler gathers the cut and windrowed crop material from the ground and then conveys the cut crop material into a bale-forming chamber within the baler. After the bale is formed and wrapped by a wrapping mechanism, the rear portion of the baler is configured to open and discharge the bale onto the field.

The pickup unit of some balers includes a pickup reel and a windguard with tines, which hold down the hay or other crop material as it is being fed to prevent the crop material from being blown off the windguard tines and to ensure an adequate compaction of the crop material. In certain instances, however, the windguard can interfere with crop material feeding into the baler. For example, certain crop types can enter through the space between the windguard roller and the windguard tine bar, causing crop to get pinched and stall the front roller on the windguard element. This could cause plugging of the pickup unit and will prevent crop from feeding into the pickup unit. When this occurs, the operator must stop and wait for the plugged windguard to clear prior to resuming the baling operation. This delay could result in loss of time and money from reduced productivity.

What is needed in the art is an agricultural baler that can effectively improve crop flow, without crop material entering the space between the windguard roller and the windguard tine bar.

SUMMARY OF THE INVENTION

Described herein is an improved windguard for agricultural balers. The windguard ensures that crop material remains engaged with the pickup tines, thereby providing consistent flow of crop material into the bale chamber.

An agricultural baler includes a windguard assembly that utilizes a front roller with spaced-apart channels disposed circumferentially on the exterior of the front roller. A tine bar is arranged above the front roller. The tine bar includes spaced-apart tines that extend downwardly from the tine bar, wrap at least partially around a central portion of the front roller, through the channels of the front roller, and extend rearwardly from the front roller toward the bale chamber wrap downwardly and around a central portion of the front roller. Because the tines wrap around the central portion of the front roller, this configuration significantly reduces or eliminates the space or gap behind the front roller and the tine bar, which prevents crop material from entering into the space between the front roller and the tine bar, thereby improving crop flow.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "forward," "rearward," "upward," "downward," "left," and "right," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Figure 1:
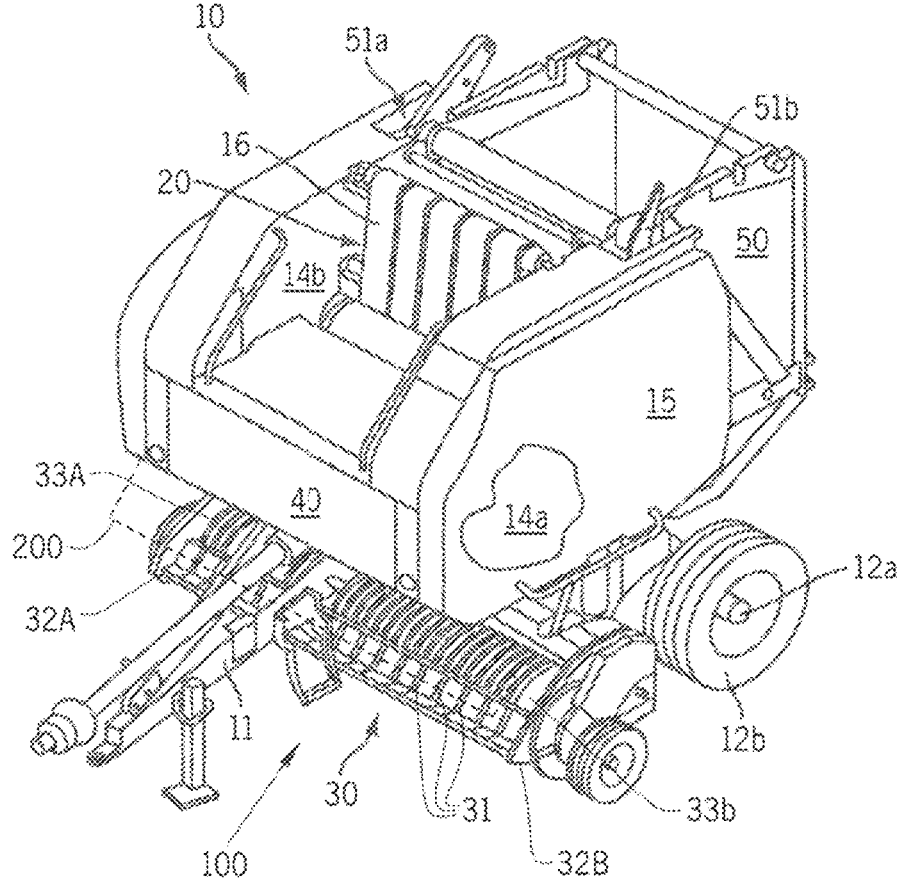
FIG. 1 illustrates an embodiment of an agricultural baler that includes a windguard assembly.

Referring now to the drawings, and more particularly to FIG. 1, illustrated is a round baler 10, which can be connected to and pulled behind an agricultural vehicle, such as a tractor (not shown), for example. The baler 10 includes a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively form a bale chamber 20. Cut crop material is lifted from windrows into the baler 10 using a pickup assembly 100. The pickup assembly 100 includes a transverse pickup roll 30 and a plurality of tines 31 carried by the pickup roll 30. From the pickup assembly 100, the crop material is transported to and fed through a feeding assembly into the bale chamber 20. As the crop material enters the bale chamber 20, multiple carrier elements, e.g. rollers, chains and slats, and/or belts (e.g., a series of conveyor belts 16), for example, begin to roll a bale of hay within the chamber, forming a cylindrically shaped bale. These carrier elements are movable so that the chamber can initially contract and subsequently expand to maintain an appropriate amount of pressure on the periphery of the bale. The bale is then optionally wrapped with twine or a net wrapping material dispensed from a wrapping mechanism generally arranged behind shield 40. Upon completion of the optional wrapping process, tailgate 50 pivots upwardly about pivot points 51a, 51b and the bale is discharged onto the ground.

It should be appreciated that while the baler 10 is illustrated in FIG. 1 and described as a round baler, in some embodiments the baler 10 can be configured as a square baler.

Turning back to FIG. 1, the pickup assembly 100 includes a pair of end flares 32A, 32B. Each end flare 32A, 32B is arranged adjacent to a respective lateral end 33A, 33B of the pickup roll 30. It should be appreciated that the end flare 32B may be configured as a mirror image of the end flare 32A due to its placement adjacent to the opposite lateral end 33B of the pickup roll 30. Each of the end flares 32A, 32B may be, for example, a curved plate or sheet of material that is shaped to redirect crop material picked up by the tines 31 as the pickup roll 30 rotates. The end flares 32A, 32B may be shaped to redirect the conveyed crop material toward the bale chamber 20, rather than allowing the conveyed crop material to be thrown back onto the field after being conveyed by the tines 31. The end flares 32A, 32B may have many different shapes, any of which may be used according to the present disclosure.

In some balers, a windguard can be included to prevent crop material from being blown away by the wind and to ensure adequate compacting during feeding of the crop material by the pickup assembly. Known windguards are arranged relatively close to the pickup reel in order to provide adequate compaction. However, this proximity to the pickup reel can cause certain crop types to enter through the space between the windguard roller and the windguard tine bar, causing crop to get pinched and stall the front roller on the windguard. The pinched crop material is not only unsightly, but can interfere with smooth feeding of crop material toward the bale chamber. In extreme cases, the pinched crop material can plug the pickup reel or the windguard, causing delays and reduced productivity.

Figure 2:
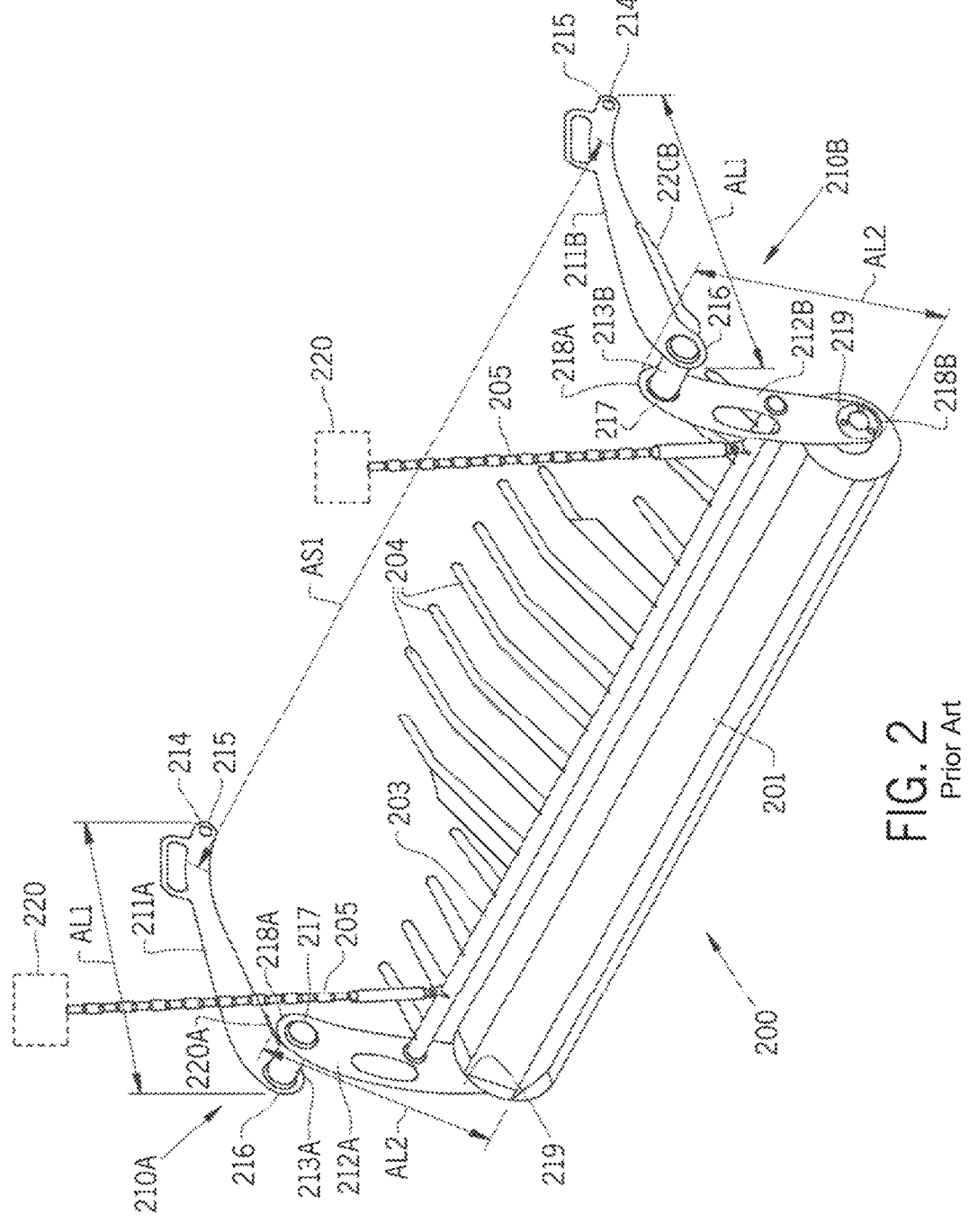
FIG. 2 illustrates a perspective view of the windguard assembly of FIG. 1.
Figure 3:
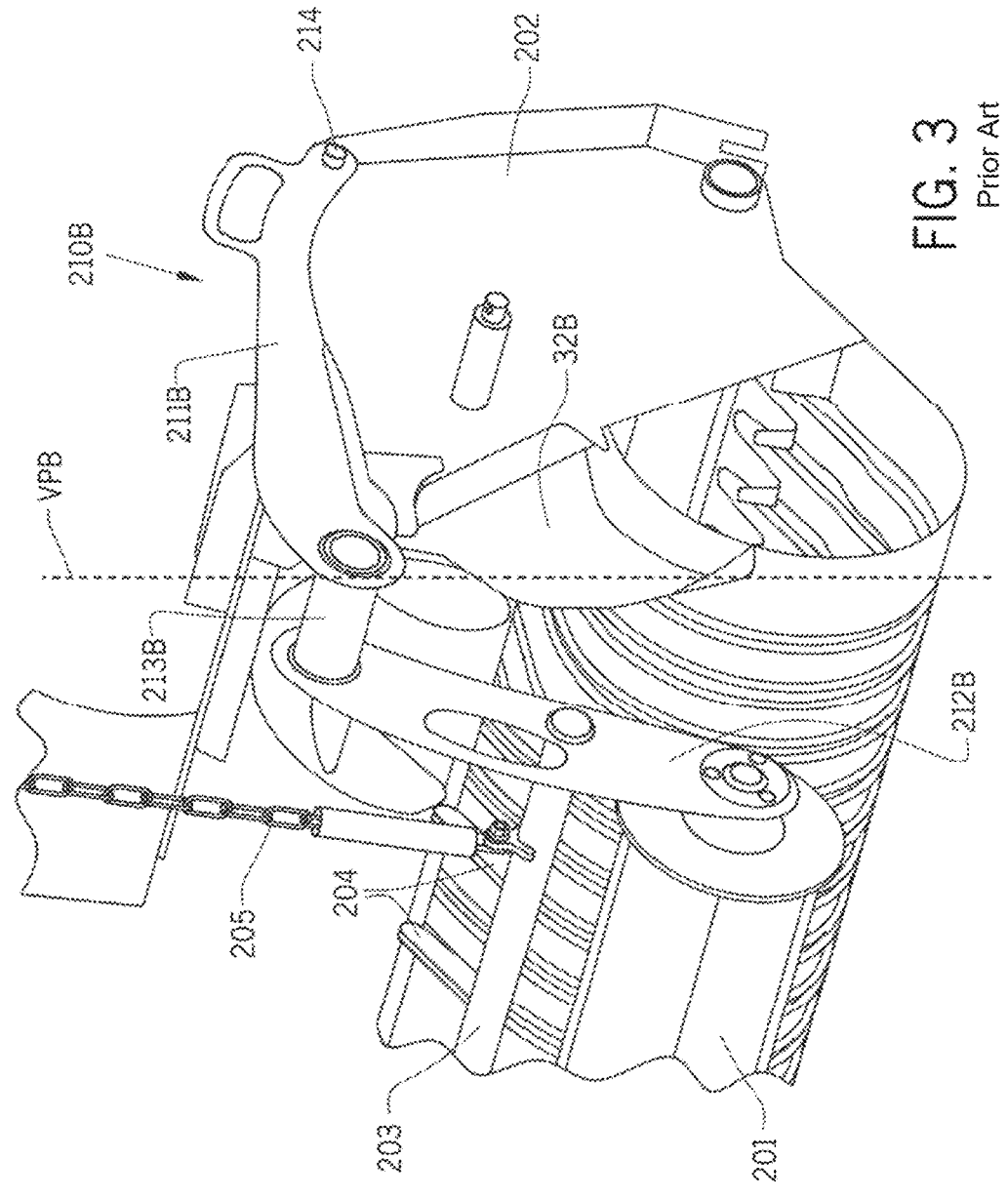
FIG. 3 illustrates a close-up perspective view of a portion of the windguard assembly of FIG. 1.

Referring now to FIGS. 1-3, the baler 10 includes a windguard assembly 200 that includes a windguard roll 201 coupled to a frame 202 (shown in FIG. 3) by a pair of arm assemblies 210A, 210B. Each of the arm assemblies 210A, 210B includes a first arm 211A, 211B pivotally coupled to the frame 202, a second arm 212A, 212B coupled to a respective first arm 211A, 211B and the windguard roll 201, and an arm connector 213A, 213B coupling the first arm 211A, 211B to the second arm 212A, 212B. Each of the arm connectors 213A, 213B can be coupled to the respective arms 211A, 212A, and 211B, 212B, such that the second arms 212A, 212B are laterally offset relative to the respectively connected first arms 211A, 211B and positioned laterally between a pair of vertical planes VPA, VPB defined by the end flares 32A, 32B. In this respect, the second arms 212A, 212B are positioned laterally inward of the end flares 32A, 32B, which allows the second arms 212A, 212B to couple to the transverse ends of the windguard roll 201.

As illustrated in FIG. 2, a second windguard element 203 can be coupled to the second arms 212A, 212B. The second windguard element 203 may be a tube or a solid section. The second windguard element 203 may include a plurality of windguard tines 204 and be connected to a pair of chains 205 that couple to one or more winch assemblies 220. The winch assembly 220 may rotate to pull or loosen the chains 205, which can adjust the height of the windguard roll 201 by causing pivoting of the first arms 211A, 211B via the connection to the second arms 212A, 212B. The second windguard element 203 may be disposed above and rearwardly of the windguard roll 201, i.e., the windguard roll 201 may be disposed forwardly and below the second windguard element 203.

Further details of baler 10 may be described in U.S. Pat. No. 11,547,053, which is incorporated by reference herein in its entirety and for all purposes.

Figure 4:
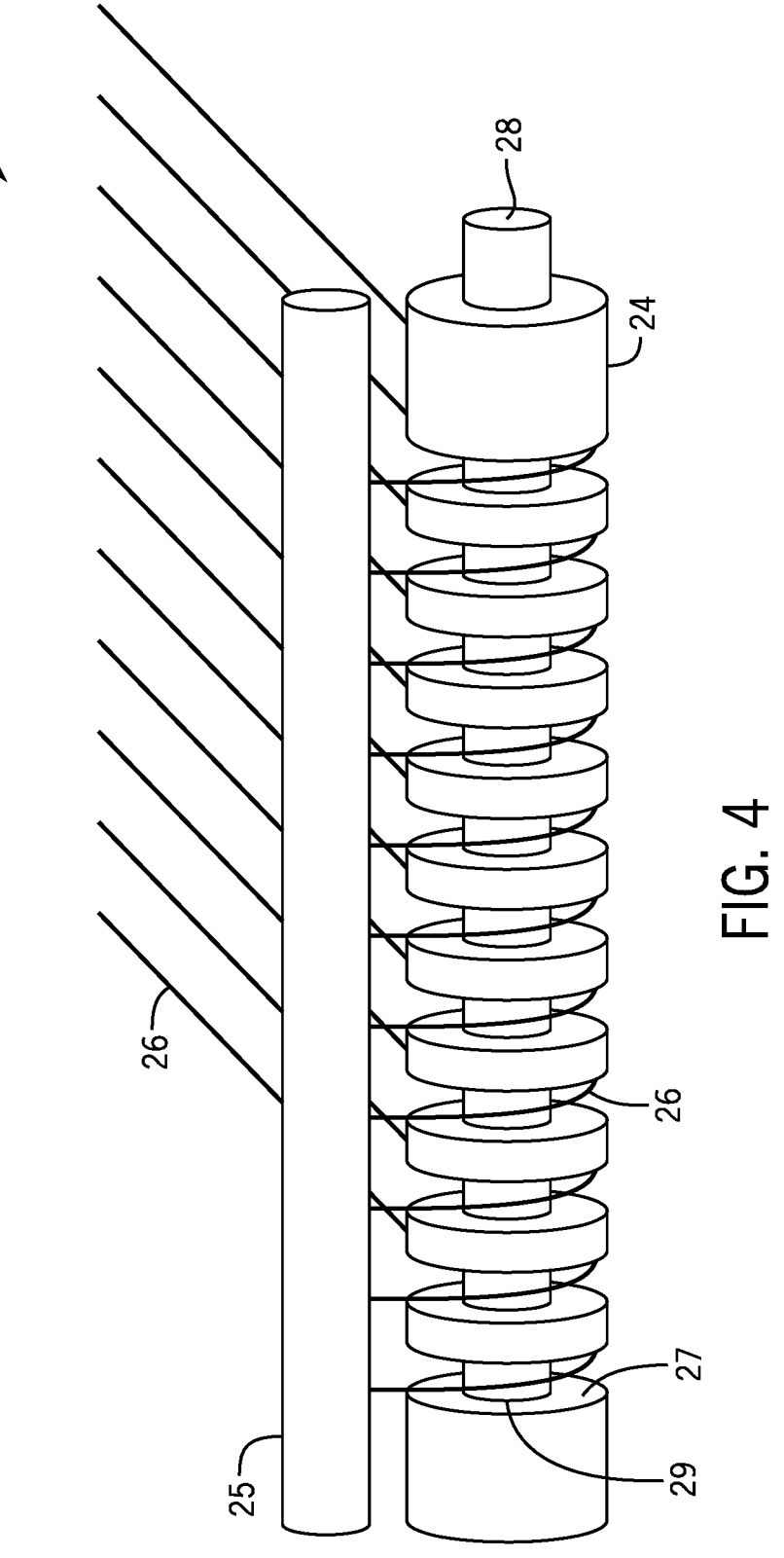
FIG. 4 is a perspective view of a windguard assembly according to an embodiment.
Figure 5:
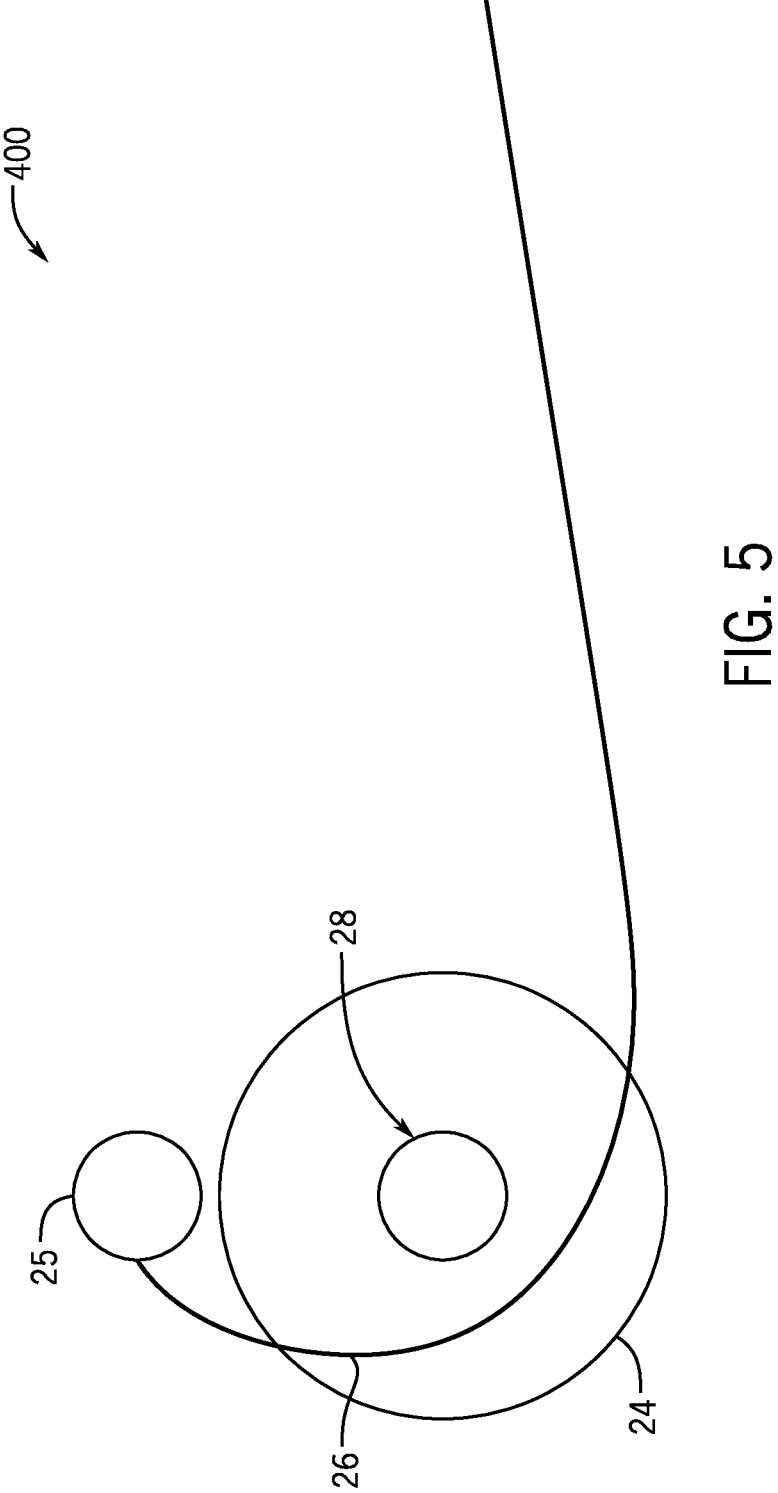
FIG. 5 is a side elevation view of the windguard assembly of FIG. 4.

According to an aspect of the present invention, and referring now specifically to FIGS. 4 and 5, an alternative windguard assembly 400 is provided for use with baler 10. The windguard assembly 400 will replace the windguard assembly 200 illustrated in FIGS. 1-3. The windguard assembly 400 will be connected to the second arms 212A, 212B, in a similar manner as the one illustrated in FIG. 2, for example. Windguard assembly 400 will extend across the width of the pickup assembly 100 of the baler 10, similar to FIG. 2. Windguard assembly 400 includes a rotating front roller 24 and a tine bar 25 configured to be arranged above the front roller 24.

The front roller 24 can be shaped as an elongated cylindrical member and is configured to extend across the width of the pickup assembly 100 of the baler 10. Front roller 24 includes a small-diameter shaft 28 and large-diameter cylindrical segments extending radially from the small-diameter shaft 28. Annular channels 27 are disposed between adjacent small and large diameter sections.

The roller shaft 28 of front roller 24 can be supported by generally vertical support arms, such as arms 212A, 212B shown in FIG. 2, for example. Each of the vertical support arms can be configured to be affixed at each transverse end of the front roller 24, using fixed pins, tubes, or similar connectors, such as a second connection region 219 shown in FIG. 2, for example. As crop material is fed into the pickup assembly 100, this connection can allow the front roller 24 to rotate about an axis formed by the pin and the roller shaft 28.

The tine bar 25 can be shaped as an elongated cylindrical member. The tine bar 25 is also configured to extend across the width of the pickup assembly 100 of the baler 10. The tine bar 25 may be arranged slightly above and slightly rearwardly relative to the front roller 24. In other words, the front roller 24 may be disposed slightly forwardly and slightly below the tine bar 25. The front roller 24 and the tine bar 25 of the windguard assembly 400 are spaced apart from each other to provide space for rotation of the front roller 24 and/or floating movement of the tine bar 25.

The tine bar 25 is arranged relatively close to the front roller 24 in order to provide adequate compaction of the crop material. However, this proximity of the tine bar 25 to the front roller 24 can interfere with crop material feeding into the bale chamber 20 of the baler 10. For example, when the front roller 24 and the tine bar 25 of the windguard assembly 400 are spaced apart from each other (e.g., to provide space for rotation or floating movement), certain crop types can enter through the space between the front roller 24 and the tine bar 25, causing crop material to get pinched and stall the front roller 24 of the windguard assembly 400. This could cause plugging of the pickup unit 22 and will prevent crop from feeding into the pickup unit 22. When this occurs, the baler operator must stop and wait for the plugged windguard to clear prior to beginning the baling operation again. This delay could result in loss of time and money from reduced productivity.

Turning back to FIG. 4, the tine bar 25 includes a plurality of spaced-apart tines 26. The tines 26 may be shaped with a round profile, such as wires or round bars, as shown in FIG.

4, for example. Tines 26 may follow a J-shaped trajectory. The fixed end of each tine 26 is fixed to the bottom side of the cylindrical tube of tine bar 26. The tines 26 can be made from metal (e.g., steel, such as cold drawn, ASTM A108 medium carbon and alloy steel, grade 1045), for example, with a round profile. Alternatively, the tines 26 can have a flat profile. The tines 26 may be affixed to the tine bar 25, for example, by welding or connected to openings formed in the tine bar 25 via nuts, bolts, or the like, for example. However, embodiments are not limited to the described configuration, and other ways for attaching the tines 26 to the tine bar 25 may be utilized, as may be known to those skilled in the art. Alternatively, the tines 26 may be integrally formed with the tine bar 25 as a single monolithic structure.

In order to ensure that crop material remains engaged with the front roller 24 and the tine bar 25 of the windguard assembly 400, the front roller 24 includes a plurality of spaced-apart channels or grooves 27 that are disposed circumferentially on the exterior surface of the front roller 24. The channels 27 can be formed, for example, by molding, casting, forming, cutting, machining, or removing a portion of the outside diameter of the front roller 24 between the two transverse ends of the front roller 24. The depth of the channels 27 is smaller than the diameter of the front roller 24, leaving intact, but with a reduced diameter, a central portion 29 of the front roller 24 between the two transverse ends of the front roller 24.

The channels 27 can be disposed on the front roller 24 in a complementary fashion relative to the tines 26 on the tine bar 25. For example, the location of, and the space between, the channels 27 can correspond to the location of, and the space between the tines 26, such that the tines 26 can extend downwardly from the surface of the tine bar 25 and pass through the channels 27 of the front roller 24 as illustrated in FIG. 4, for example.

When the tine bar 25 is mounted on the baler 10 slightly above and slightly rearwardly relative to the front roller 24, as described above, the tines 26 extend downwardly from the surface of the tine bar 25 and forwardly through the channels 27 of the front roller 24. The tines 26 wrap around the central portion 29 of the front roller 24 and then extend rearwardly straight back from the front roller 24 toward the feeding assembly and the chamber 20 of the baler 10. Because the tines 26 wrap around the central portion 29 of the front roller 24, this configuration can significantly reduce or eliminate the space or gap behind the front roller 24 and the tine bar 25, which can prevent crop material from gathering in, and plugging up, the space between the front roller 24 and the tine bar 25, thereby improving the flow of crop material.

The tines 26 can be configured to have a length that is long enough to allow the tines 26, when mounted to the baler 10, to extend downwardly from the surface of the tine bar 25, then forwardly through the channels 27, wrap around the central portion 29 of the front roller 24, and then extend rearwardly straight back from the front roller 24 toward the feeding assembly and the chamber 20 of the baler 10.

The tines 26 can be configured to have a thickness (or a diameter, in case the tines have a round profile) that is smaller than the width and the depth of the channels 27. These dimensions can allow the tines 26 to freely pass through the channels 27 while wrapping around the central portion 29 of the front roller 24 and extending rearwardly toward the feeding assembly and the chamber 20 of the baler 10. As a result, the tines 26 can be flexible enough to move within the channels 27, as the front roller 24 of the windguard assembly 400 rotates and the tine bar 25 pivots, allowing the tines 26 to float. At the same time, the tines 26 and the channels 27 can keep the crop material down and engaged with the tines 26, such that the crop material can advance to, and feed into, the baler chamber 20 efficiently with a consistent flow.

In certain embodiments, as illustrated in FIG. 4, for example, the tine bar 25 can have a diameter that is smaller than the overall diameter of the front roller 24 (e.g., including the diameter of the central portion 29 and the depth of the channels 27). For example, the diameter of the tine bar 25 can be similar to, or slightly larger than, the diameter of the central portion 29 of the front roller 24. Alternatively, the tine bar 25 can have a diameter that is substantially the same as the diameter of the front roller 24. Regardless of the dimensions of the tine bar 25 and the front roller 24, however, the locations and dimensions of, and the spacing between, the channels 27 are designed in a complementary fashion (e.g., corresponding to) the locations and dimensions of, and the spacing between, the tines 26, as illustrated in FIG. 4, for example.

The tine bar 25 can be supported by a structure similar to the supporting structure of the front roller 24. For example, the tine bar 25 can be supported by generally vertical support arms (such as arms 212A, 212B shown in FIG. 2, for example). Each of the vertical support arms can be configured to be affixed at each transverse end of the tine bar 25, similar to the front roller 24. Each of the vertical support arms can be configured to be affixed at each transverse end of the tine bar 25, using fixed pins, tubes, or similar connectors, such as a second connection region 219 shown in FIG. 2, for example. As crop material is fed into the pickup assembly 100, this connection can allow the tine bar 25 to pivot about its own axis and/or an axis formed by the pin to adjust the angle of the tines 26 as crop material feeds into the pickup assembly 100, allowing the tines 26 to float.

Alternatively, each transverse end of the tine bar 25 may be connected to a pair of chains (such as chains 205 shown in FIGS. 2 and 3, for example) that couple to one or more winch assemblies (such as winch assemblies 220 shown in FIGS. 2 and 3, for example). The winch assemblies 220 may rotate to pull or loosen the chains 205, which can adjust the height of the tine bar 25.

Regardless of the mounting arrangement of the front roller 24 and the tine bar 25, the front roller 24 and the tine bar 25 can be adequately supported across the width of the pickup assembly 100. The tine bar 25 can pivot to adjust the angle of the tines 26 as the volume of crop material moves through the pickup assembly 100 and allow the tines 26 to float, thereby providing the desired contact with, and compaction of, crop material. For example, the tine bar 25 can pivot to hold down the crop material as it is being fed rearwardly into the chamber 20. The pivot point of the tine bar 25 can be positioned well above the rotation point of the front roller 24 to allow large slugs of crop to pass underneath.

The windguard assembly 400 illustrated in the figures and described above can be implemented in any hay and forage agricultural vehicle that harvests a grass type crop, including but not limited to pull-type forage harvester grass pickups, self-propelled forage harvester grass pickups, round baler pickups, small square baler pickups, or large square baler pickups, for example.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:

a chassis;

a bale chamber supported by the chassis; and a pickup with a windguard assembly, the windguard assembly including:

(a) a rotatable front roller having a plurality of axially spaced-apart channels that are each disposed circumferentially on an exterior surface of the front roller, wherein the front roller includes a cylindrical shaft having a first outer diameter and a plurality of cylindrical segments each having a second outer diameter that is greater than the first outer diameter, wherein the plurality of cylindrical segments are spaced apart along a length of the front roller, wherein each cylindrical segment extends in a radial direction from the cylindrical shaft, and wherein each channel is disposed between two adjacent cylindrical segments of the plurality of cylindrical segments; and (b) a tine bar configured to be arranged above the front roller, the tine bar having a plurality of axially spaced-apart tines, each tine extending downwardly from the tine bar and rearwardly from the front roller toward the bale chamber, and each tine being configured to wrap at least partially around a respective one of the channels of the front roller.

2. The agricultural baler of claim 1, wherein the plurality of spaced-apart channels are disposed in a complementary fashion relative to the plurality of spaced-apart tines.

3. The agricultural baler of claim 1, wherein a first location and a first spacing between the plurality of spaced-apart channels corresponds to a second location and a second spacing between the plurality of spaced-apart tines.

4. The agricultural baler of claim 1, wherein a depth of each of the plurality of spaced-apart channels is smaller than the second outer diameter of the front roller.

5. The agricultural baler of claim 4, wherein the plurality of spaced-apart channels are disposed around the cylindrical shaft of the front roller.

6. The agricultural baler of claim 5, wherein the plurality of spaced-apart channels are configured to wrap at least partially around the cylindrical shaft of the front roller.

7. The agricultural baler of claim 1, wherein a thickness of each of the plurality of spaced-apart tines is less than a depth of each of the plurality of spaced-apart channels.

8. The agricultural baler of claim 1, wherein the tine bar is arranged rearwardly relative to the front roller.

9. The agricultural baler of claim 1, wherein the tine bar and the front roller are spaced from each other.

10. The agricultural baler of claim 1, wherein the front roller extends across a width of the pickup.

11. The agricultural baler of claim 1, wherein the tine bar extends across a width of the pickup.

12. The agricultural baler of claim 11, wherein the tine bar is pivotably connected to vertical support arms, each connected to a transverse end of the tine bar by a pin connector.

13. The agricultural baler of claim 12, wherein the tine bar is configured to pivot about an axis formed by the pin connector.

14. The agricultural baler of claim 1, wherein a pivoting movement of the tine bar is configured to adjust the angle of each of the plurality of spaced-apart tines.

15. An agricultural vehicle comprising the agricultural baler of claim 1.

16. The agricultural baler of claim 1, wherein each cylindrical segment has a cylindrical and revolved outer surface.

17. The agricultural baler of claim 1, wherein the second outer diameter of each cylindrical segment is uniform.

18. The agricultural baler of claim 1, wherein each cylindrical segment has two opposing side surfaces each side surface having an annular shape.

19. The agricultural baler of claim 1, wherein each channel has an annular shape.

20. The agricultural baler of claim 1, wherein the plurality of cylindrical segments are fixed to the cylindrical shaft.

* * * * *